United States Patent [19]

Adlparvar et al.

[11] Patent Number: 5,653,904
[45] Date of Patent: Aug. 5, 1997

[54] DEFOGGING SYSTEM FOR THE FRONT AND REAR WINDSHIELDS OF A VEHICLE

[76] Inventors: Sam Adlparvar; Hassan Adlparvar, both of 11502 Riderwood Dr., Houston, Tex. 77099

[21] Appl. No.: 665,688

[22] Filed: Jun. 18, 1996

[51] Int. Cl.⁶ .................... B60L 1/02; B60H 1/02
[52] U.S. Cl. .................... 219/203; 219/508; 219/509; 165/43; 237/12.3 A; 237/28
[58] Field of Search .................... 219/202–203, 219/507–509, 518, 522; 165/42–43; 237/12.3 A, 12.3 R, 12.4, 12.6, 28; 364/424.05; 392/347, 360, 365–369, 379, 480

[56] References Cited

U.S. PATENT DOCUMENTS

| | | | |
|---|---|---|---|
| 3,995,140 | 11/1976 | Kuiff et al. | 219/203 |
| 4,048,469 | 9/1977 | Ciarniello et al. | 219/203 |
| 4,196,338 | 4/1980 | Edel | 219/203 |
| 4,513,808 | 4/1985 | Ito et al. | 165/43 |
| 4,520,258 | 5/1985 | Grohmann | 219/203 |
| 4,821,792 | 4/1989 | Bednarek | 165/17 |
| 4,899,809 | 2/1990 | Takenaka et al. | 165/12 |
| 4,942,364 | 7/1990 | Nishijima et al. | 324/696 |
| 5,121,321 | 6/1992 | Sasaki et al. | 219/203 |
| 5,186,682 | 2/1993 | Iida | 165/43 |
| 5,187,349 | 2/1993 | Curhan et al. | 219/202 |
| 5,275,012 | 1/1994 | Dage et al. | 237/12.3 A |
| 5,279,459 | 1/1994 | Single II | 237/2 A |

*Primary Examiner*—Teresa J. Walberg
*Assistant Examiner*—Raphael Valencia
*Attorney, Agent, or Firm*—Stephen R. Greiner

[57] ABSTRACT

A system for automatically defogging both the windshield and rear window of an automobile. The system includes moisture and dew detection sensors positioned on the interior surfaces of the windshield and the rear window of the automobile. The sensors transmit an electrical current signal to a program control module. If the current received by the program control module from either of the windshield sensors exceeds a predetermined response threshold, it will energize a relay to activate the windshield blower. On the other hand, should the program control module receive a signal from one of the sensors on the rear window, it will energize another relay to activate a resistance heating grid on the rear window. When the condensation on either the windshield or rear window has been evaporated, the program control module will deactivate the associated defogging device.

13 Claims, 1 Drawing Sheet

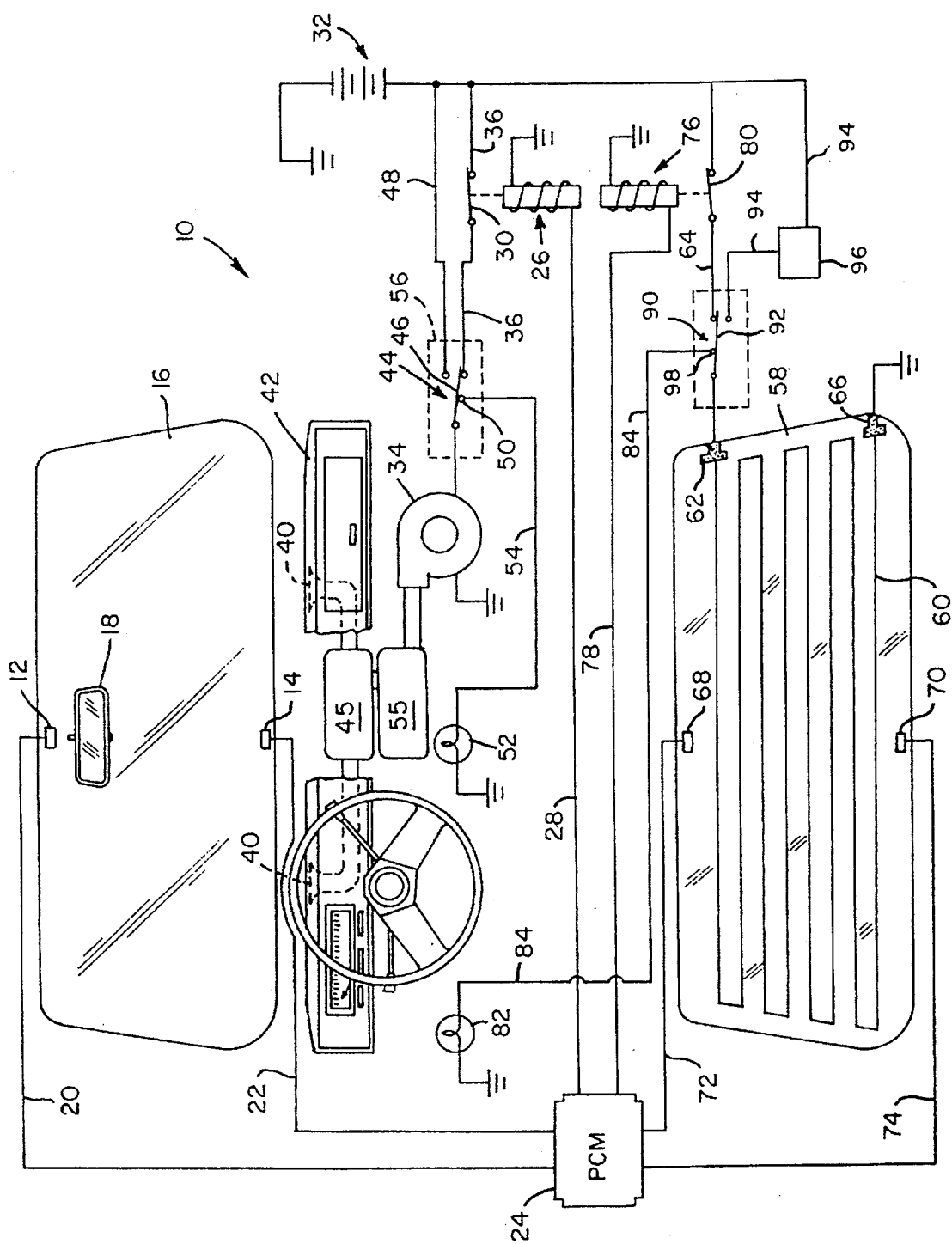

DEFOGGING SYSTEM FOR THE FRONT AND REAR WINDSHIELDS OF A VEHICLE

FIELD OF THE INVENTION

The present invention relates generally to humidity-responsive defogging systems for vehicles.

BACKGROUND OF THE INVENTION

Diverse apparatus have been developed for keeping the windshields and rear windows of automobiles clear of fog. Today, electric blowers or are commonly used for clearing windshields. Electric resistance heaters, secured to the rear window, are employed for removing condensation therefrom.

Manually-operated switches are usually provided so that the operator of an automobile can energize the usual blower and resistance heater when needed. The drain on the automobile battery therefore continues until the operator deenergizes the defogging apparatus which may be a long time after the windshield and rear window are free of fog. This continuing drain can reduce the performance of the battery, blower and resistance heater. Gasoline consumption of the automobile is also adversely impacted.

SUMMARY OF THE INVENTION

In light of the problems associated with the prior art defogging apparatus, it is a principal object of the invention to provide a fully automatic system for defogging the windshield and rear window of an automobile. The invention makes it possible to energize a blower for clearing a windshield when moisture or dew is sensed on the inside surface thereof and, similarly, to energize a resistance-type heating grid for clearing a rear window of an automobile. In use, the invention minimizes battery drain, decreases the consumption of gasoline and, thus, improves the performance of the automobile.

It is an object of the invention to provide improved elements and arrangements thereof in an automatic windshield defogging system which is relatively inexpensive, dependable and fully effective in accomplishing its intended purposes.

Briefly, the defogging system in accordance with this invention achieves the intended objects by featuring at least one sensor secured to the automobile windshield for outputting an electrical signal in response to the level of moisture or dew. A blower is positioned adjacent the windshield for delivering a stream of air thereto. A first switch is connected between the blower and the automobile battery for selectively delivering electrical power to the blower. A first relay is provided for controlling the first switch. An electrical resistance heating grid is secured to the rear window of the automobile. At least one sensor is secured to the rear window for outputting an electrical signal in response to the level of moisture or dew. A second switch is connected between the heating grid and the battery for selectively delivering electrical power to the heating grid. A second relay is provided for controlling the second switch A program control module is connected to the sensors on the windshield and rear window and to both of the relays.

The program control module supplies electrical current to the first relay for closing the first switch when the signal received from the first sensor exceeds a predetermined response threshold. The program control module also supplies electrical current to the second relay for closing the second switch when the signal received from the second sensor exceeds a predetermined response threshold.

The foregoing and other objects, features and advantages of the present invention will become readily apparent upon further review of the following detailed description of the preferred embodiment as illustrated in the accompanying drawings.

BRIEF DESCRIPTION OF THE DRAWING

The present invention may be more readily described with reference to the accompanying drawing which is a schematic electrical circuit diagram of an automatic windshield defogging system in accordance with the present invention.

DETAILED DESCRIPTION OF THE PREFERRED EMBODIMENT

Referring now to the drawing, an electrical circuit diagram for an automatic windshield defogging system in accordance with the present invention is shown at 10. The system 10 includes a pair of moisture and dew detection sensors 12 and 14 secured to the surface of a tempered glass windshield 16 which is to be exposed to the interior of an automobile. One moisture and dew detection sensor 12 is preferably located at the top of the windshield 16 adjacent the rear view mirror 18. The other sensor 14 is positioned below the first sensor 12 and adjacent the bottom of the windshield 16. Neither sensor 12 nor 14 is positioned so as to obscure the field of vision through the windshield 16.

The sensors 12 and 14 are connected, respectively, through leads 20 and 22 to a microcomputer or program control module 24 which receives electrical current inputs from the sensors and yields electrical current outputs in response thereto. These outputs may be delivered from the program control module 24 to an electromagnetic relay 26 through a lead 28. For example, when a current exceeding a predetermined response threshold passes through either of the leads 20 or 22 to the program control module 24, the program control module will operate to energize the coil of the relay 26 by delivering an electrical current through the lead 28.

When energized, the contact 30 of the relay 26 may connect the positive terminal of a power source, such as storage battery 32, with a blower 34 through a lead 36. The air discharged from the blower 34 is directed through one or more hoses 38 to diffusers 40 in the automobile dash board 42 for venting onto the surface of the windshield 16 adjacent the sensors 12 and 14. Thus, any condensation present on the windshield 16 will be evaporated by the air vented from the diffusers 40.

To hasten the rate of evaporation, the air discharged by the blower 34 may be warmed by passage through a heat exchanger such as heater 45 prior to release from the diffusers 40. Alternatively, the heater 45 may be deenergized and the air may be passed through a selectively-energized refrigeration unit 55 to cool the air prior to its discharge from the diffusers 40. The distribution of cooled air to the windshield 16 may be advantageous in removing moisture therefrom during periods of warm weather.

When the current from either sensor 12 or 14 falls below the response threshold, the program control module 24 will deenergize the coil of the relay 26 by terminating the flow of electrical current through the lead 28. Thus, the contact 30 will move to disconnect the blower 34 from the power source 32 and cease the blowing of air onto the windshield 16.

A switch 44 is connected in series with the relay-controlled contact 30. The switch 44 is provided with a movable contact 46 which may be positioned by an operator so that the lead 36 is electrically connected to the blower 34 as illustrated. Thus, the blower 34 will be automatically actuated whenever the contact 30 is closed by the relay 26. When the contact 46 is moved to its second position, however, automatic control of the blower 34 is terminated since the relay-controlled contact 30 is bypassed. Instead, the blower 34 is connected directly to the power source 32 through a lead 48 and is energized at all times.

The contact 46 may be manually positioned so that it is not in electrical communication with either of the leads 36 or 48. In this position, electrical current from the power source 32 is prevented from reaching the blower 34 and such is deenergized. By moving the contact 46 back into contact with either of the leads 36 or 48 electrical current flow to the blower 34 is restored in the manner noted above.

To visually alert the operator that the blower 34 is functioning automatically, the switch 44 is provided with a terminal 50 for energizing a remote incandescent lamp 52 through a lead 54. The terminal 50 is positioned such that when the contact 46 is closed across the lead 36, as shown, the terminal 50 will be placed in electrical communication with the power source 32 and the lamp 52 will be energized. When the contact 46 is opened across the lead 36, on the other hand, the terminal 50 will be isolated from the power source 32 and the lamp 52 will be deenergized.

The lamp 52 may be mounted in any convenient location within the automobile. Similarly, the switch 44 may be mounted anywhere within the reach of an operator. The optimum location for the switch 44, however, is probably on the usual climate control panel in the automobile dash board. (To enhance understanding of the drawing, the climate control panel is shown schematically by broken lines at 56 removed from the dash board 42.)

The rear window 58 comprises a sheet of tempered glass having a heating grid 60 formed on the surface thereof which is exposed to the interior of the automobile. The heating grid 60 comprises a sinuous electrical resistor connected at one of its ends 62 to an electrical lead 64 extending from the positive terminal of the power supply 32 and at its other end 66 to the ground. The grid 60 may be applied to the rear window 58 in any suitable manner including, for example, a silk screen process wherein metal particles and a glass frit are melted onto the tempered glass by high-temperature baking.

Closely adjacent the top and bottom of the heating grid 60, a pair of moisture and dew detection sensors 68 and 70 are secured to the rear window 58. As shown, the sensors 68 and 70 are positioned midway between the sides of the window 58 so that fogging may be detected where it occurs most readily. Central positioning of the sensors also ensures optimum clearing of the center portion of the rear window 58 during operation of the system 10.

The sensors 68 and 70 are connected, respectively, through leads 72 and 74 to the program control module 24. The program control module 24, in turn, is connected to an electromagnetic relay 76 through a lead 78. When a current exceeding a predetermined response threshold passes through either of the leads 72 or 74 to the program control module 24, the program control module will operate to energize the coil of the relay 76 by delivering a sufficient electrical current through the lead 78.

When energized, the contact 80 of the relay 76 will connect the positive terminal of the power source 32 with the heating grid 60 thereby causing the heating grid to warm and evaporate any condensation which may be present on the rear window 58. When the current from either sensor 68 or 70 falls below the response threshold, the program control module 24 will operate to deenergize the coil of the relay 76. Thus, the contact 80 will disconnect the heating grid 60 from the positive terminal of the power source 32 causing the heating grid to cool.

A manually operable switch 90 is connected in series between the heating grid 60 and the movable contact 80. The switch 90, which may be mounted in any convenient location within the automobile, itself includes a movable contact 92 which may be positioned by an operator so that the lead 64 is electrically connected to the end 62 of the heating grid 60. The heating grid 60, then, will be automatically actuated whenever the contact 80 is closed by the relay 76.

When the contact 92 is moved into electrical communication with lead 94, automatic control of the heating grid 60 is terminated and the heating grid 60 is connected to the power source 32 through a conventional timer relay 96. By means of the timer relay 96, the heating grid 60 will receive electrical current for a predetermined period of time, say fifteen minutes. When this period of time is over, the timer relay 96 will terminate the flow of electrical current to the heating grid 60 and deenergize it.

To visually alert the operator that the heating grid 60 is automatically functioning, the switch 90 is provided with a terminal 98 for energizing an incandescent lamp 82 through lead 84. The terminal is positioned such that when contact 92 is closed across lead 64, as shown in the FIGURE, the terminal 98 is placed in electrical communication with the power source 32 and the lamp 82 is energized. Like the lamp 52, lamp 82 may be mounted anywhere within the automobile.

The moisture and dew detection sensors 12, 14, 68 and 70 may comprise any compact device capable of detecting changes in atmospheric humidity or liquid condensation on a surface through variations in internal electrical resistance. Preferably, however, the sensors 12, 14, 68 and 70 are of the type illustrated in U.S. Pat. No. 4,942,364, issued Jul. 17, 1990, to Nishijimi et al, which is hereby incorporated by reference for all purposes. Not only do sensors proposed by Nishijimi include means for rapid mounting but their construction also permits a fast response time to humidity or condensation changes.

The automatic windshield defogging system 10 may be readily installed in automobiles and other vehicles at the time of their manufacture. In the alternative, the defogging system 10 may be configured in the form of a kit for after-market installation. Regardless of the time when the system is installed, the driver or operator of an automobile so equipped will never have difficulty seeing through the automobile windshield or rear window.

While the invention has been described with a high degree of particularity, it will be appreciated by those skilled in the art that numerous modifications and substitutions may be made thereto. For example, the number and location of the moisture and dew detection sensors on the windshield and rear window may be varied in accordance with need. Therefore, it is to be understood that the present invention is not limited to the sole embodiment described above, but encompasses any and all embodiments within the scope of the following claims.

We claim:

1. A defogging system for a vehicle having a first window and a second window positioned remotely from said first window, said system comprising:

an electrical power source;

a first sensor secured to said first window for outputting an electrical signal in response to the level of moisture or dew in its immediate vicinity;

a blower for delivering a stream of air onto said first window, said blower being in selective electrical communication with said electrical power source;

a first switch connected between said blower and said electrical power source for selectively delivering electrical power to said blower;

a first relay for controlling said first switch;

an electrical resistance heating grid secured to said second window, said heating grid being in selective electrical communication with said electrical power source;

a second sensor, secured to the second window, for outputting an electrical signal in response to the level of moisture or dew in its immediate vicinity;

a second switch connected between said heating grid and said electrical power source for selectively delivering electrical power to said heating grid;

a second relay for controlling said second switch; and, a program control module connected to both of said sensors and both of said relays, said program control module supplying electrical current to said first relay for closing said first switch when the signal received from said first sensor exceeds a predetermined response threshold, and said program control module supplying electrical current to said second relay for closing said second switch when the signal received from said second sensor exceeds a predetermined response threshold.

2. The defogging system according to claim 1 further comprising a third switch connected between said first switch and said blower, said third switch may operate to bypass said first switch and place said blower in electrical communication with said electrical power source.

3. The defogging system according to claim 2 further comprising a first lamp bulb connected with said third switch for visually indicating that said blower is receiving electrical power from said electrical power source.

4. The defogging system according to claim 1 further comprising a second lamp bulb connected between said second switch and said heating grid for visually indicating that said heating grid is receiving electrical power from said power source.

5. The defogging system according to claim 1 further comprising a heat exchanger in communication with said blower.

6. A defogging system for a vehicle having a first window and a second window positioned remotely from said first window, said system comprising:

an electrical power source;

a first sensor secured to said first window for outputting an electrical signal in response to a given level of moisture or dew in its immediate vicinity;

a blower adjacent said first window, said blower being in selective electrical communication with said electrical power source;

a heat exchanger positioned so as to receive and warm the stream of air discharged from said blower prior to delivery of the air onto said first window;

a first switch connected between said blower and said electrical power source for selectively delivering electrical power to said blower;

a first relay for controlling said first switch;

an electrical resistance heating grid secured to said second window, said heating grid being in selective electrical communication with said electrical power source;

a second sensor, secured to the second window adjacent said heating grid, for outputting an electrical signal in response to a given level of moisture or dew in its immediate vicinity;

a second switch connected between said heating grid and said electrical power source for selectively delivering electrical power to said heating grid;

a second relay for controlling said second switch; and, a program control module connected to both of said sensors and both of said relays, said program control module supplying electrical current to said first relay and closing said first switch when the signal received from said first sensor exceeds a predetermined response threshold, and said program control module supplying electrical current to said second relay and closing said second switch when the signal received from said second sensor exceeds a predetermined response threshold.

7. The defogging system according to claim 6 further comprising a third switch connected between said first switch and said blower, said third switch having a movable contact for placing said blower in electrical communication with said electrical power source and bypassing said first switch.

8. The defogging system according to claim 7 further comprising a first lamp bulb connected with said third switch for visually indicating that said blower is receiving electrical power from said electrical power source.

9. The defogging system according to claim 8 further comprising a second lamp bulb connected between said second switch and said heating grid for visually indicating that said heating grid is receiving electrical power from said power source.

10. A defogging system for an automobile having a windshield and a rear window, said system comprising:

a storage battery;

a pair of first moisture and dew detection sensors secured to a windshield for outputting electrical signals in response to the level of moisture or dew in their vicinity;

a blower adjacent said windshield, said blower being in selective electrical communication with said battery;

a heat exchanger in communication with said blower;

a first switch connected between said blower and said battery for selectively delivering electrical power to said blower;

a first relay for controlling said first switch;

an electrical resistance heating grid secured to said rear window, said heating grid being in selective electrical communication with said battery;

a pair of second sensors, secured to the rear window adjacent said heating grid for outputting electrical signals in response to the level of moisture or dew in their immediate vicinity;

a second switch connected between said heating grid and said battery for selectively delivering electrical power to said heating grid;

a second relay for controlling said second switch; and, a microcomputer connected to both of said sensors and both of said relays, said microcomputer supplying electrical current to said first relay and closing said first switch when the signal received from said first sensors exceeds a predetermined response threshold, and said microcomputer supplying electrical current to said second relay and closing said second switch when the signal received from said second sensors exceeds a predetermined response threshold.

11. The defogging system according to claim 10 further comprising a third switch connected between said first switch and said blower, said third switch may operate to bypass said first switch and place said blower in electrical communication with said battery.

12. The defogging system according to claim 11 further comprising a first lamp bulb connected with said third switch for visually indicating that said blower is receiving electrical power from said battery.

13. The defogging system according to claim 12 further comprising a second lamp bulb connected between said second switch and said heating grid for visually indicating that said heating grid is receiving electrical power from said battery.

* * * * *